Feb. 9, 1960    A. IMHOF    2,924,264
LAMINATED BODY AND METHOD OF MAKING THE SAME
Filed July 18, 1955
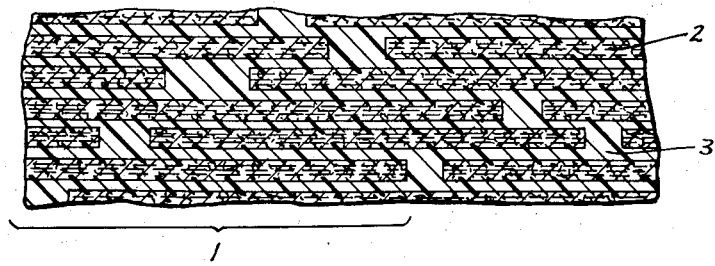
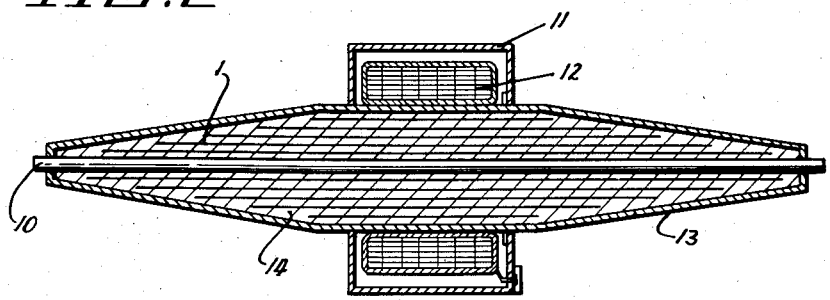
INVENTOR.
Alfred Imhof
BY Michael S. Striker
    agt

United States Patent Office 2,924,264
Patented Feb. 9, 1960

2,924,264

LAMINATED BODY AND METHOD OF MAKING THE SAME

Alfred Imhof, Zurich, Switzerland, assignor to Moser-Glaser & Co. A.G., Muttenz, near Basel, Switzerland Application July 18, 1955, Serial No. 522,735

Claims priority, application Switzerland July 17, 1954

26 Claims. (Cl. 154—2.6)

The present invention relates to a laminated body and method of making the same, and more particularly to a solid laminated body containing a liquid dielectric composition.

It is an object of the present invention to provide as an insulating material a solid laminated body which can be attached to or formed about various elements of electrical equipment and which, while consisting of a coherent solid laminated body, contains a liquid dielectric composition.

Other objects and advantages of the present invention will become apparent from a further reading of the description and the appended claims.

With the above objects in view, the present invention mainly consists of a laminated body, comprising, in combination, a plurality of layers of absorbent sheet material impregnated with a liquid dielectric composition, and a solid hardened synthetic resin surrounding each of the layers of absorbent sheet material penetrating the same and adhering to the layers forming a coherent laminated body in which escape of the liquid dielectric composition is prevented by the surrounding solid synthetic resin.

The present invention also consists in a method of producing a laminated body, comprising the steps of forming alternate layers of absorbent sheet material impregnated with a liquid dielectric composition, and of hardenable synthetic resin, the outer layers of the alternate layers being hardenable synthetic resin, and hardening said hardenable synthetic resin, thereby forming a coherent laminated body in which escape of the liquid dielectric composition is prevented by the surrounding solid synthetic resin.

According to the present invention an absorbent sheet material such as paper is impregnated with a liquid dielectric composition such as mineral oil. The impregnated sheet material is covered with a hardenable synthetic resin and then wrapped in a plurality of layers about itself or about an element of an electrical installation. The hardenable resin causes the layers to adhere strongly to each other, and also seals the liquid dielectric composition which has been absorbed by the absorbent sheet material, so that the same cannot escape. The resins used for this purpose belong to the groups which are hardenable without giving off fluid constituents, such as epoxy resins or polyester resins.

The present invention also relates to a method of producing a solid laminated insulating body according to which the absorbent sheet material is impregnated with a liquid dielectric composition and the individual layers formed by the sheet material are glued to each other by hardening a hardenable synthetic resin with which the layers are covered. The hardenable resin may be added to the sheet material after the same has been impregnated with the liquid dielectric composition. It is however also possible to mix the liquid dielectric composition with the hardenable resin or with a resin hardener. It is also within the scope of the present invention to form an emulsion consisting of the liquid dielectric composition and either the hardenable resin or the resin hardener. If a mixture or emulsion has thus been formed, the absorbent sheet material is impregnated with the dielectric composition and covered with the resin or resin hardener in one step.

Various types of paper can be used as absorbent sheet material according to the present invention, especially if the laminated body is to be of great dielectric strength. It is also possible to use fabric made for instance of cotton, glass fibers, nylon, Teflon and the like. The absorbent sheet material has to be chosen in accordance with the desired specific dielectric and mechanical strength requirements. The materials mentioned above are therefore given as examples only and the present invention is not meant to be limited to the above enumerated absorbent sheet materials.

In the case of high voltage insulation, so-called cable or condenser papers are advantageously used. When a combination of high mechanical and dielectric qualities is required, advantageously a combination of paper layers having excellent dielectric properties, and, for instance, glass fiber fabric layers of great mechanical strength can be used.

The thickness of the layers of absorbent sheet material is also to be chosen in consideration of the specific requirements of the installation. If paper is used as absorbent sheet material, a thickness of between 0.01 mm. and 0.25 mm. is preferred. The relative amount of resin in the laminated body increases with the reduction of thickness of the paper and thereby a harder and dryer laminated body is obtained. However, it is more expensive to use relatively thin paper layers than to use layers of greater thickness. The density of the paper has also to be determined in accordance with the specific requirements of the finished laminated body since the relative amount of liquid dielectric composition within the laminated body decreases with increased density of the paper.

In any event it is important that the chosen paper or fabric is completely dry prior to being impregnated. Similarly the liquid dielectric composition and the submersion liquid, which will be described later, must be carefully dehydrated before use.

Mineral oils are primarily used as liquid dielectric composition and preferably the insulating oils which are already customarily employed in high voltage installations, such as insulating oils and transformer oils. If low viscosity of the liquid dielectric composition is desired, kerosene may be advantageously used. In installations where combustibility is to be avoided or to be reduced, a composition belonging to the group of liquid chlordiphenyls can be used alone, or in a mixture with trichlorobenzene or mineral oil, or also a mixture of hexachlorobutadiene with mineral oil, preferably containing between 30 and 40% by weight of hexachlorobutadiene can be employed. The last-named compositions have approximately equal dielectric properties, however, they show higher $tg\delta$ values than mineral oil. For insulating laminated bodies, the physical characteristics of which must remain substantially constant over a wide range of temperatures, silicon oils can be used as impregnating liquids. Silicon oils offer the further advantages that they are water-repellent and chemically stable.

In accordance with the present invention hardenable synthetic resins can be used which will be hardened by polymerization, by addition of a resin hardener, with or without application of heat, provided however, that during hardening these resins must not give off any fluid substances. This is most important in order to avoid the formation of gas bubbles within the laminated body. It is also important that the resins, once hardened, do not soften again under applicable conditions of use.

The following resins are listed as examples of hardenable resins which may be used in accordance with the present invention, the invention however not being limited to the specific examples:

Epoxy resins (such as for instance available under the trademarks "Araldit" or "Epikote").

Unsaturated polyester resins (such as for instance available under the trademarks "Marco-Resins," "Leguval," "Paraplex").

The advantage of the polyester resins, as compared with the epoxy resins, is that their use is more economical. However, polyester resins show a greater degree of shrinkage upon hardening than epoxy resins, and therefore great care has to be taken when using polyester resins, to avoid crack formation in the laminated body.

Resin hardeners for the different hardenable resins are well known in the art. By way of example only, and without limiting the present invention to the specific hardeners, the following are mentioned:

For epoxy resins: diethylenetetramine (for instance CIBA-Hardener 951), or diethylenetriamine.

For unsaturated polyester resins: methylethylketone peroxide in dimethylphthalate (known as Lupersol DDM) plus cobalt naphthenate as catalyst, or benzoyl peroxide in tricresyl phosphate (known as Luperco ATC) plus cobalt naphthenate.

According to the method of the present invention the absorbent sheet material is impregnated with the liquid dielectric composition, and the individual layers of the impregnated sheet material are glued to each other by being covered with a hardenable synthetic resin which is capable of hardening by a polymerization, polyaddition or similar reaction without bubble formation.

The two process steps of impregnating the absorbent sheet material with a liquid dielectric composition, and forming a coherent laminated body by means of the hardenable synthetic resin, may either take place in sequence or simultaneously. In the latter case preferably an emulsion is formed of the liquid dielectric composition and the hardenable synthetic resin.

It is obviously of importance that the absorbent sheet material is impregnated in dry, water-free condition. Drying of the sheet material prior to impregnation is preferably performed under vacuum, in order to obtain highest insulating properties.

Hardening may take place partly during or before the formation of the superposed layer structure, however, in many cases it is preferred to harden the hardenable resin after the laminated body has been formed. This can easily be done since, in accordance with the present invention, resins are used which do not give off gas during the hardening process.

In such cases where the liquid dielectric composition would upon application of heat release gas bubbles, for instance due to evaporation, preferably a cold-hardening resin is used.

It is also within the scope of the present invention to adhere dielectric lamellae or splittings, such as mica splittings to the layers of absorbent sheet material. Excellent results are thereby obtained for instance in the manufacture of coil insulators for high voltage generators and motors, because a hard flexible insulation, rich in mica and substantially free of pores is thus obtained. Apart from mica splittings which are preferred because of their high resistance against corona discharge and because of their high thermal stability, it is also possible to use less expensive materials such as are known under the trademark "Samica" as well as other foils, small leaves of glass, or the material known under the trademark "Mylar."

The method of the present invention can be used to produce laminated bodies of a great variety of shapes such as laminated pipes, hollow cylinders of varying profile cross-sections, and the like. These hollow shapes can be produced by forming superposed layers of impregnated and resin-covered absorbent sheet material around cores of desired cross-section and removing the thus formed laminated hollow bodies from the cores after partial or complete hardening of the resin. Contrary to methods known in the art, cores made of materials of limited hardness, firmness and heat resistance may be used in accordance with the present invention, since the process of the present invention is performed under conditions of relatively low pressure and temperature.

It is important that in accordance with the present invention the absorbent sheet material, for instance in band form, may be directly applied by hand or also by mechanical means, to elements of electrical apparatus which are to be insulated, such as transformer coils, iron cores, connecting conduits, bus bars, cables, cable end and connecting mountings, condenser coils, generator and motor coils, voltage carrying parts of switching apparatus and the like. The laminated body produced in accordance with the present invention can so be made as to conform to the shape of any individual parts to be insulated. On relatively simple surfaces such as cylinders, the plurality of layers of the laminated body will preferably be formed by mechanical means, while the formation of the multi-layer laminated body of the present invention around surfaces of more complicated configuration is preferably done by hand. This is possible because in accordance with the present invention neither high temperatures nor high pressures are required for forming the laminated multi-layer body, and because the hardening does not have to take place continuously, but may be executed after completion of the forming of the laminated body.

It is also possible according to the present invention to add hardenable resin only after a certain number of layers of impregnated absorbent sheet material have already been formed. In this case a combined dielectric body is formed which in its innermost part consists of layers impregnated with the liquid dielectric composition and which is surrounded by a shell consisting of the laminated body of the present invention. This shell has now the function of a container, and, if of suitable thickness, also of a dielectric body. In some cases it is desirable to make this shell electrically conductive or to embody metal foils therein. If this is desired, the absorbent sheet material may comprise conductive materials such as fine wire fabric, graphited paper or metal backed paper or metal foils.

By adding all or part of the resin hardener to the hardenable resin prior to applying the same to the sheet material, the viscosity of the hardenable resin increases while the same is being used, due to the action of the resin hardener. This has certain disadvantages since the amount of resin which is applied to the sheet material depends on the viscosity of the resin. At the beginning of the process, when the viscosity of the resin is low, a thicker coating is obtained than after the hardening process of the resin in the resin storage container has progressed. Furthermore, it is necessary to remove the resin from the storage container from time to time when its viscosity becomes too high. This disadvantage of progressive hardening of the resin hardener containing resin prior to application of the same can be counteracted to a limited extent only by cooling of the resin in the storage container.

It is within the scope of the present invention to prevent the increase in the viscosity of the resin prior to its application by applying the resin without the addition of a resin hardener or with the addition of only a reduced quantity of resin hardener. Instead all or most of the resin hardener is added to the liquid dielectric composition, preferably by finely dispersing the resin hardener in the liquid dielectric composition in the form of an emulsion.

The absorbent sheet material is then impregnated with the resin hardener containing liquid dielectric composition and, upon subsequent application of the hardenable resin the resin comes in contact with the hardener containing emulsion, and is hardened thereby. In this way it is for instance possible to produce completely impregnated hardened paper layers which have a dielectric loss factor $tg\delta$ of less than 0.5%. Due to the complete impregnation of the paper, its heat conductivity is greater than of previously known hardened paper, its loss factor is smaller, and for this reason the material made according to the foregoing embodiment of the present invention can be used for voltages exceeding 400 kv.

It is therefore within the scope of the present invention to either add the resin hardener to the hardenable resin prior to application of the same, or to add the hardener to the liquid dielectric composition, or to add a portion of the hardener to the hardenable resin prior to application of the same and the remaining portion of the liquid dielectric composition.

Under certain conditions there exists the danger of including air when forming the plurality of layers of impregnated sheet material. The included air then remains between the layers and will be ionized in an intense electric field. The ionized air may then lead to a breakdown of the electrical insulation. This danger hardly exists when the layers are formed around simple geometrical elements such as cylinder electrodes, however, it poses a distinct problem when the layers of impregnated absorbent sheet material are to be formed around electrodes of more complicated geometrical configurations such as ring electrodes. Even when using elastic sheet material such as crepe paper, very great care has to be taken to avoid air inclusions. To form the layers under vacuum and thus prevent the inclusion of air poses great difficulties.

According to an embodiment of the present invention air inclusions in the laminated body are prevented by forming the superposed layers of absorbent sheet material within an insulating or immersion liquid. The electrical apparatus or core around which the laminated body is to be formed, is submerged in a suitable liquid and the absorbent sheet material is wound about the core while it too is submerged in the liquid. The hardenable synthetic resin may also be applied underneath the surface of the immersion liquid, or it may be applied outside of the liquid.

Preferably the immersion liquid is identical with the liquid dielectric composition. Thereby not only the keeping of supplies is simplified but also the storing of impregnated sheet material in the immersion liquid for unlimited times is made possible without risking the mixing of the immersion liquid with the liquid dielectric composition. While it is thus preferred in many cases to use the liquid dielectric composition also as immersion liquid, it does not necessarily have to be so. It is also possible to use as immersion liquid an oil of lesser viscosity than the liquid dielectric composition. Thereby it is achieved that during forming of the layers very little immersion liquid remains since the less viscous immersion liquid can more easily escape from the sheet material. When using as immersion liquid a chlorodiphenyl, a solution of oil and chlorphenyl is formed in the boundary layer of oil-impregnated absorbent sheet material. This solution possesses a higher dielectric constant than the oil, and thereby an advantageous distribution of the entire dielectric properties in the laminated body is obtained. If low combustibility of the laminated body is of importance, a chlorodiphenyl, for instance, is chosen as liquid dielectric composition, and a dichlorobenzene as submersion liquid. If a lower viscosity of the immersion liquid is desired, for instance transformer oil may be used as liquid dielectric composition for impregnating the absorbent sheet material, and kerosene as immersion liquid.

It has now surprisingly been found that it is possible absorbent sheet material underneath the surface of an to apply the hardenable resin, and to wind the treated immersion liquid. This has been experimentally proven for the resins mentioned above.

Furthermore, it is also possible to harden the resin fully or in part while submerged in the immersion liquid, consisting, for instance, of mineral oil, whereby preferably the immersion liquid is kept at an elevated temperature of for instance between 50 to 80° C. Thereby one has only to take care that leaking off of the hardenable resin from the point of application is prevented by suitable devices. This may easily be achieved for instance by pressing rubber-elastic cushions on the laminated body while the same is being formed. The resin application device can for instance be made of partly open-cell or sponge-like material in such a way that the hardenable resin flows in through the center zone of the sponge. Hardening of the resin can at least partly be achieved by means of heating elements positioned on the laminated body. It is also possible to achieve complete or partial hardening by heating in an electric high frequency field.

In the above-described manner it is possible to form in submersion hard and continuous, jointless, crack-free insulations about bolts, pipes or electrodes of any desired shape, as well as to form insulating pipes or plates of any desired size which do not contain air, either in the pores of the absorbent sheet material or between the layers of the same. Consequently, the thus formed laminated bodies possess excellent dielectric properties such as extremely high dielectric strength and low $tg\delta$ values. A dielectric strength of between 30 and 40 kv./mm. and a $tg\delta$ of between 0.005–0.020 has been obtained.

It is also within the scope of the present invention to store a supply of impregnated absorbent sheet material, for instance in the form of a roll, within the immersion liquid. Oil-impregnated absorbent sheet material may thus for instance for any length of time be stored submerged in oil. Thereby contact between the impregnated absorbent sheet material and air is prevented and the material cannot absorb either air or moisture.

It is sufficient to place the element which is to be insulated, just a small distance underneath the surface of the immersion liquid so that the element is completely covered by the liquid. The operation is further facilitated by using a transparent container for the submersion liquid, made for instance of glass or plexiglass, whereby visual observance of the working area is achieved.

It is possible in accordance with the last-described embodiment of the method of the present invention to produce joint and crack-free insulations for a great variety of electrical high voltage equipment, even of large dimensions such as transformers of any kind and for any voltage and amperage, switching apparatus, bus bars, generator and motor coils. As with casting resins, the method of the present invention also permits the complete embedding of current-conducting parts. However, the method of the present invention offers the advantage that it may be applied to much larger parts of electrical apparatus and that molds are not required. It is a special advantage of the method of the present invention that dry insulations of all kinds and types may be formed. Up to now oil-impregnated paper cable insulations are in use for insulating under oil. These prior art insulations show the serious disadvantage that upon removal of the insulated active electrical part from the oil, be it for repair, check-up or change, moisture is frequently absorbed to such an extent as to impair or destroy the insulation. This disadvantage is fully overcome with insulations made according to the present invention. Furthermore, the so-called "cable insulations" are very sensitive against mechanical pressure and blows, while insulations made in accordance with the present invention may be stored and exposed to the atmosphere, and due to their great mechanical strength, are much less sensitive against any outward actions or influences.

The material costs of the laminated body made according to the present invention are rather low, especially if paper is used as absorbent sheet material, since only the hardenable resin commands a somewhat higher price and it is used only to the extent of between 10 and 30% by weight of the entire laminated body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows an enlarged cross-section through a portion of a laminated body according to the present invention; and Fig. 2 shows a cross-section through a current transformer including the laminated body of the present invention.

Referring now to the drawings, and particularly to Fig. 1, the laminated body 1 is shown to comprise a plurality of layers of absorbent sheet material 2 impregnated with a liquid dielectric composition. The solid sheet material may for instance be paper and the liquid dielectric composition transformer oil. The individual layers of the absorbent sheet material 2 are glued to each other by means of thin layers of hardened resin 3 which fills the spaces between the absorbent sheet material and also penetrates to a limited depth through the surface of the individual layers 2.

The layers of hardened resin 3 are formed of a hardenable resin which has been hardened without giving-off of fluid constituents, so that the entire laminated body forms a solid structure free of gas bubbles.

The current transformer shown in Fig. 2 comprises the conventional copper conductor 10, housing 11, ring with secondary coils 12, and covering of non-combustible material 13. Copper conductor 10 is embedded in an insulator 1 consisting of the laminated body of the present invention in which, in the illustrated embodiment, between some of the layers 2 of absorbent sheet material, metal foils 14 are inserted for capacitive field modulation. After the copper conductor 10 has been embedded in the laminated body according to the present invention, and the same has been hardened, the ring with secondary coils 12 and housing 11 are mounted thereon. In the illustrated embodiment, the laminated body is covered with a non-combustible covering 13 preferably consisting of a poured layer of low pressure resins containing suitable additives. Covering 13 may also consist of ceramic material or of a plastic-impregnated fabric.

The following examples are given as illustrative only, the scope of the invention however not being limited to the specific details of the examples.

EXAMPLE 1

A lead-in for nominal potential of 110 k./v. having a length of about 2000 mm., an outer diameter of 125 mm. and an inner diameter of 30 mm. is prepared as follows:

*Materials used*

Hardenable synthetic resin: a cold hardenable liquid epoxy resin.

Resin hardener: diethylenetetramine in a quantity of between 10 and 11 parts by weight for 100 parts of epoxy resin.

Absorbent sheet material: a crepe paper band of 60 millimeters width, paper thickness about 0.2 mm., supplied in rolls of about 100 mm. diameter. The customary paper quality for high-grade electrical insulations is used.

Liquid dielectric composition: a good transformer oil.

In this case it is intended to enclose in the laminated body according to the present invention condenser inserts for modulation of the electric field. As insert a Höchstädter-paper of 0.1 mm. thickness is used.

Paper band rolls, and the condenser inserts cut to proper size, are first dried with hot air, then died under vacuum and finally impregnated with the transformer oil. Thereafter and until use, the papers are stored in a closed, oil-filled container. In this way air and moisture absorption during storage is prevented for months if necessary. The resin mixture has to be prepared immediately prior to making the lead-in. The resin and the hardener are taken from their storage containers and poured in the proportion of 100 parts by weight resin and between 10 and 11 parts by weight hardener into a mixing container provided with stirring equipment. The finished laminated body will have an insulating volume of about 18.5 cubic decimeters. The quantity of resin which is prepared at any one time has so to be chosen that it will be used up before the viscosity increases too much.

A first portion of the hardener-resin mixture is filled into the container of an immersion bath used for covering the paper with the resin mixture. The balance of the resin mixture is kept in a water bath at a temperature of below 15° C. and is filled as needed into the container of the immersion bath. In order to have optimum working conditions the room temperature should be kept between 20 and 25° C. It is important that the relative humidity is as low as possible and in any case below 30%. The part to be insulated, for instance a copper bolt, is de-fatted with acetone and thereafter coated with the resin mixture. After removing surplus oil from the paper band roll, the same is placed into a holder from which the paper band is conducted to the copper bolt through a tensioning device and through the immersion bath. The free end of the band is attached in the proper position on the copper bolt. During the entire operation care has to be taken that the band is under sufficient tensioning. The automatic lateral movement of the band is in this case so chosen as to amount to about one-half of the band width per turn. The band moves preferably with a speed of between 0.1 and 0.5 meters per second. A resin stripper is provided at the point where the band leaves the resin immersion bath and is to be carefully so adjusted that the band when wound on the bolt still loses on both sides a mixture of resin and transformer oil which is pressed out of the band by the winding under tension on the copper bolt. This mixture of resin and oil forms a small rim-shaped mass on both sides of the band and serves to further prevent the inclusion of air into the laminated structure. After a first layer is thus formed along the entire length of the bolt, the paper band is cut off and firmly clamped to the end of the bolt. Since the lateral movement of the band was chosen to amount to about half of the band width, the thickness of this first layer is about twice the thickness of the paper band. Thereafter the paper band holder is moved again into its initial position and a second layer is formed on top of the first layer as described above. Care should be taken to start new rolls of paper band at the beginning of a layer, since the start of a new roll anywhere else but at the beginning of a layer will cause an increase in thickness of the insulating layer at the point where paper from the new roll is superimposed over the end of the paper from the old roll.

When, after the formation of several layers, the desired diameter is reached, the first layer of condenser paper is put in proper position on top of the last impregnated paper layer and an additional paper layer wound on top of the condenser paper layer in order to keep the latter in proper position. The amount of resin carried with the paper band has thereby to be increased in order to completely fill the perforations in the Höchstädter-paper with resin. This increase in the amount of resin to be carried by the paper band is achieved by properly adjusting the resin stripper.

In the described manner, and for a winding length of 2 meters, a plurality of layers having a combined thickness of about 5 mm. will be formed in about 1 hour. Since the thickness of the entire laminated body in this case is supposed to be 45 mm., a winding time of about 9 hours is required. The work may be interrupted, even overnight, since the resin which hardens in a few hours protects the interior of the insulating body against absorption of moisture. Upon resumption of the winding process it is necessary to first put on a sufficient coating of resin.

A grounding layer is applied as final condenser layer. Thereafter, over the entire length of the lead-in, crepe paper is applied in a thickness of about 1.5 mm., in order to even out any irregularities.

On top thereof follows the surface layer of resin wetted glass silk band. Since the glass band possesses considerably less elasticity than the crepe paper, its width is limited to between 15 and 20 mm. in order to give best results. The roll of glass silk band is stored under dry conditions. It is inserted into the band holder without any special pretreatment, and wetted with resin in the immersion bath. The lateral advance of the glass band on the surface of the insulating body is again chosen as half the band width. A total layer of about 1 mm. thickness of glass band is formed. This takes, depending on the thickness of the glass band, between 3 and 5 windings. Thereby a covering is obtained which is extremely resistant against external influences and will under all circumstances prevent an eventual diffusion after long periods of time of liquid dielectric composition from the laminated body.

Subsequently, the hardening of the laminated body is achieved in a separate step. For this purpose the body is removed from the winding equipment so that the same is free to be used again for the preparation of additional laminated bodies. The laminated body which is to be hardened is then turnably positioned in a suitable device and hardened for 10 to 15 hours under continuous rotation at about 40 revolutions per minute, and at a temperature of between 20 and 25° C. Superfluous resin is thereby removed from the surface. The hardening time can be considerably reduced by application of higher temperatures, especially by means of radiation heaters or by employing a high frequency field. The mechanical working of the ends of the lead-in follows. Superfluous insulation is cut off and the insulating ends are worked to the desired shape. The entire body is then covered with a suitable lacquer and finally hardened for about 24 hours in an oven at a temperature of between 60 and 80° C.

The specific weight of the completed insulation amounts to 1.17 grams per cubic centimeter and consequently the weight of the insulation amounts to 21.4 kilograms.

1 cubic decimeter of the thus formed hardened laminated insulation contains:

|  | By Weight | By Volume |
| --- | --- | --- |
| synthetic resin | 450 g.=38% | 393 cm.³=39% |
| crepe paper | 380 g.=33% | 254 cm.³=25% |
| Höchstädter-paper | 90 g.= 8% | 58 cm.³= 6% |
| transformer oil | 250 g.=21% | 295 cm.³=30% |
| Total | 1,170 g.=100% | 1,000 cm.³=100% |

For a total of 18.3 cubic decimeters of insulation the following materials are required:

| | Kilograms |
| --- | --- |
| Synthetic resins (mixture of resin and hardener) | 8.2 |
| Crepe paper band (in dry storage) | 7 |
| Höchstädter-paper (in dry storage) | 1.7 |
| Transformer oil | 4.5 |
| Total | 21.4 |

EXAMPLE 2

An insulating laminated body for a 30 k./v. lead-in having a length of 600 mm., an outer diameter of 40 mm. and a bolt diameter of 16 mm., is prepared in a submersion liquid as follows:

Materials used: Hardenable synthetic resin: ethoxyline resin.

Resin-hardener: diethylenetriamine in a quantity of between 9 and 10 parts by weight for 100 parts of ethoxyline resin.

Absorbent sheet material: paper roll of high-grade electrical qualities, having a width of 600 mm., a paper thickness of 0.08 mm. and a roll diameter of about 100 mm.

Condenser insert: aluminum foil having a thickness of 0.03 mm.

Liquid dielectric composition: transformer oil having a viscosity of 500 cst.

Submersion liquid: transformer oil having a viscosity of 10 cst.

The entire manufacturing process takes place in a container filled with submersion liquid. The roll of absorbent sheet material is also arranged inside the submersion container and covered by the submersion liquid. The winding machine is substantially similar to the one referred to in Example 1.

The resin coating device is also located in the submersion liquid and is provided with reversing pulleys for the positioning and releasing of the paper rolls and with an adjustable resin stripping device. Care has to be taken to reduce to a minimum the penetration of submersion liquid into the resin coating device, especially at the side at which the paper enters the resin coating device. It is advantageous to connect the closed coating device by means of a pipe with a storage container for the resin mixture located outside of the submersion tank, so that the coating device can be continuously supplied with the resin mixture. The paper rolls first are dried in hot air, then under vacuum, thereafter impregnated with the liquid dielectric composition, and placed in the holder located in the submersion liquid.

Generally the manufacturing process then corresponds to the one described in Example 1.

The paper speed is chosen to be between 0.05 and 0.2 m./sec. After the prescribed diameter for the first condenser insert has been reached, the aluminum foil is wound about together with the paper and without cutting the paper. The paper is only cut prior to applying the grounding layer. The paper end is held in position on the lead-in by means of a cotton band bandage. After the grounding layer has been placed in position, additional resin coated paper layers are wound about in an additional thickness of about 1 mm.

As soon as the insulating body has been completely wound, it is taken out of the winding device and placed in another submersion liquid container filled with submersion liquid, and is hardened therein at a temperature of between 30 and 40° C. for a period of between 6 and 10 hours. Subsequently the insulating body is de-fatted and a casting resin is cast around the same. It is also possible to cast rain protectors and a fixing flange onto the insulating body simultaneously with the casting of the resin.

EXAMPLE 3

Manufacture of an insulating pipe of good mechanical properties and good chemical resistance, as well as high resistance against moisture absorption.

Materials used: Hardenable synthetic resin: 100 parts by weight of unsaturated polyester resin and 50 parts by weight of styrene.

Resin hardener: 1.5 parts by weight of methylethylketone peroxide in dimethylphthalate and 0.5 parts by weight of cobalt naphthenate.

Absorbent sheet material: cotton band.

Liquid dielectric composition: silicon oil having a viscosity of 500 cst. and setting point of between —45 and —50° C.

The manufacturing of the insulating pipe is done in accordance with the procedure described in Example 1 with the exception that the preliminary hardening takes place at 50° C. over a period of between 8 and 10 hours, and the final hardening at 115° C. over a period of between 10 and 12 hours.

EXAMPLE 4

Manufacture of a mechanically strong, arc extinguishing chamber for a circuit breaker with minimum oil content. The material must be substantially non-combustible. The requirements with respect to electric insulating quality are not especially high.

Dimensions of the pipe body:

| | Millimeters |
|---|---|
| Length | 500 |
| Inner diameter | 80 |
| Outer diameter | 120 |

Materials used: Hardenable synthetic resin: 100 parts by weight of unsaturated polyester resin plus 40 parts by weight styrene.

Resin hardener: 1.7 parts by weight of benzoyl peroxide in tricresyl phosphate plus 0.2 part by weight of cobalt naphthenate.

Absorbent sheet material: a glass fiber fabric of 500 mm. width.

Liquid dielectric composition: a chlorinated diphenyl having a specific gravity of 1.45 g./cm.$^3$, a viscosity of 2000 Saybolt Universal Seconds, such as Arochlor 1248 of Monsanto.

The extinguishing chamber is manufactured in submersion, using Arochlor as submersion liquid, similarly as described in Example 2. Since the thus formed hollow cylinder must be pulled off from the winding bolt, a two-part bolt with a paper layer of 0.5 mm. thickness is used. The extinguishing chamber is formed by winding impregnated and resin wetted glass fiber fabric thereon. After preliminary hardening of the thus formed laminated body, the two-part winding bolt is put apart and the paper layer removed from the pipe. The final paper layer which adheres to the inner surface of the pipe is rubbed off on a lathe with glass paper.

It will be understood that each of the elements described above, or two or more together, may also find a useful application in other types of laminated bodies differing from the types described above.

While the invention has been illustrated and described as embodied in solid laminated bodies containing a liquid dielectric composition, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A laminated body comprising, in combination, a plurality of layers of a fibrous absorbent sheet material impregnated with a permanently liquid dielectric composition; and a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin.

2. A laminated body comprising, in combination, a plurality of layers of absorbent paper impregnated with a permanently liquid dielectric composition; and a solid irreversibly hardened synthetic resin surrounding each of said layers of absorbent paper penetrating at most surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin.

3. A laminated body comprising, in combination, a plurality of layers of absorbent fabric impregnated with a permanently liquid dielectric composition; and a solid irreversibly hardened synthetic resin completely surrounding each of said layers of absorbent fabric, the interior portion of each of said impregnated layers being substantially free of hardened resin, said hardened resin adhering to said layers, thereby forming a coherent laminated body in which escape of said liquid dielectric composition is prevented by the surrounding solid synthetic resin.

4. A laminated body comprising, in combination, a plurality of layers of a fibrous absorbent sheet material impregnated with a mineral oil; and a solid irreversibly hardened synthetic resin surrounding each of said layers of absorbent sheet material penetrating surface portions only of the same the oil-impregnated remainder of each of said layers being free of solid resin, said irreversibly hardened resin adhering to said layers completely surrounding the same, thereby forming a coherent laminated body in which escape of said mineral oil from the interior portions of said layers is prevented by the surrounding solid synthetic resin.

5. A laminated body comprising, in combination, a plurality of layers of a fibrous absorbent sheet material impregnated with a liquid chlorodiphenyl; and a solid irreversibly hardened synthetic resin surrounding each of said layers of absorbent sheet material penetrating surface portions only of the same, the impregnated remainder of each of said layers being free of said solid irreversibly hardened resin, said resin adhering to said layers forming a coherent laminated body in which escape of said liquid chlorodiphenyl is prevented by the surrounding solid synthetic resin.

6. A laminated body comprising, in combination, a plurality of layers of a fibrous absorbent sheet material impregnated with a mixture of a chlorodiphenyl and trichlorobenzene; and a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said mixture is prevented by the surrounding solid synthetic resin.

7. A laminated body comprising, in combination, a plurality of layers of a fibrous absorbent sheet material impregnated with a liquid fluorinated hydrocarbon; and a solid irreversibly hardened synthetic resin surrounding each of said layers of absorbent sheet material penetrating at most surface portions only of the same, the impregnated remainder of each of said layers being free of said solid irreversibly hardened resin, said resin adhering to said layers completely surrounding the same, thereby forming a coherent laminated body in which escape of said liquid fluorinated hydrocarbon is prevented by the surrounding solid synthetic resin.

8. A laminated body comprising, in combination, a plurality of layers of a fibrous absorbent sheet material impregnated with a mixture containing approximately 60 to 70% of transformer oil and 40 to 30% hexachlorobutadiene; and a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said mixture is prevented by the surrounding solid synthetic resin.

9. A laminated body comprising, in combination, a plurality of layers of a fibrous absorbent sheet material impregnated with a liquid dielectric composition selected from the group consisting of mineral oils, chlorodiphenyl, trichlorobenzene, hexachlorobutadiene, silicone oils and liquid fluorinated hydrocarbons; and a solid irreversibly hardened resin selected from the group consisting of epoxy resins and polyester resins surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin.

10. A laminated body comprising, in combination, a plurality of layers of a fibrous absorbent sheet material impregnated with a permanently liquid dielectric composition; and a solid irreversibly hardened polyester resin completely surrounding each of said layers of absorbent sheet material, the interior portion of each of said impregnated layers being substantially free of hardened resin, said hardened resin adhering to said layers, thereby forming a coherent laminated body in which escape of said liquid dielectric composition is prevented by the surrounding solid synthetic resin.

11. A method of producing a laminated body, comprising the steps of forming layers of fibrous absorbent sheet material impregnated with a permanently liquid dielectric composition, and alternating layers of an irreversibly hardenable synthetic resin, the outer layers of said alternating layers being layers of hardenable synthetic resin; and hardening said irreversibly hardenable synthetic resin, said dielectric composition remaining in liquid state, so as to form a coherent laminated body consisting essentially of liquid-impregnated layers of absorbent sheet material at least the interior portions of which are free of hardened resin, surrounded by said hardened resin, whereby escape of said liquid dielectric composition is prevented by the surrounding solid synthetic resin.

12. A method of producing a laminated body, comprising the steps of impregnating a fibrous absorbent sheet material with a permanently liquid dielectric composition; completely covering said impregnated sheet material with an irreversibly hardenable synthetic resin; forming a plurality of superposed layers of said resin-covered impregnated sheet material; and hardening said irreversibly hardenable synthetic resin said dielectric composition remaining in liquid state, so as to form a coherent laminated body consisting essentially of liquid-impregnated layers of absorbent sheet material at least the interior portions of which are free of hardened resin, surrounded by said hardened resin, whereby escape of said liquid dielectric composition is prevented by the surrounding solid synthetic resin.

13. A method of producing a laminated body comprising the steps of impregnating and completely covering a fibrous absorbent sheet material with an emulsion essentially consisting of a permanently liquid dielectric composition and of an irreversibly hardenable synthetic resin; forming a plurality of superposed layers of said resin-covered impregnated sheet material; and hardening said irreversibly hardenable synthetic resin said dielectric composition remaining in liquid state so as to form a coherent laminated body consisting essentially of liquid-impregnated layers of absorbent sheet material at least the interior portions of which are free of hardened resin, surrounded by said hardened resin, whereby escape of said liquid dielectric composition is prevented by the surrounding solid synthetic resin.

14. A method of producing a laminated body, comprising the steps of impregnating a fibrous absorbent sheet material with a permanently liquid dielectric composition containing a resin hardener; completely covering said impregnated sheet material with a synthetic resin adapted to be irreversibly hardened by said resin hardener; forming a plurality of superposed layers of said resin-covered impregnated sheet material; and hardening said hardenable synthetic resin said dielectric composition remaining in liquid state, so as to form a coherent laminated body consisting essentially of liquid-impregnated layers of absorbent sheet material at least the interior portions of which are free of hardened resin, surrounded by said hardened resin, whereby escape of said liquid dielectric composition is prevented by the surrounding solid synthetic resin.

15. A method according to claim 12 wherein the steps of applying said irreversibly hardenable synthetic resin and of forming a plurality of superposed layers are performed while said impregnated sheet material is submerged in a submersion liquid having a viscosity not exceeding the viscosity of said permanently liquid dielectric composition and being substantially incapable of dissolving said resin.

16. A method according to claim 12 wherein the steps of applying said irreversibly hardenable synthetic resin and of forming a plurality of superposed layers are performed while said impregnated sheet material is submerged in a submersion liquid being substantially incapable of dissolving said resin.

17. A method according to claim 16 wherein said irreversibly hardenable synthetic resin is at least partially hardened while said plurality of superposed layers is submerged in said submersion liquid.

18. A method according to claim 16 in which said irreversibly hardenable resin is a heat-hardenable resin and including the step of hardening said heat-hardenable synthetic resin by heating said submersion liquid at a temperature sufficiently high to harden said heat-hardenable resin while said plurality of superposed layers is submerged therein.

19. A method according to claim 16 in which said irreversibly hardenable synthetic resin is a heat-hardenable synthetic resin and including the step of forming an electrical high frequency field in said submersion liquid containing said plurality of superposed layers, thereby heating said heat-hardenable resin at a temperature sufficiently high to at least partially harden said heat hardenable resin.

20. A method according to claim 12 wherein the step of forming a plurality of superposed layers is performed while said impregnated fibrous sheet material is submerged in a submersion liquid being substantially incapable of dissolving said resin.

21. A laminated body comprising, in combination, a plurality of layers of a fibrous absorbent sheet material impregnated with a permanently liquid dielectric composition; a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin; and a plurality of thin bodies of electrically insulating material interposed between said layers.

22. A laminated body comprising, in combination, a plurality of layers of fibrous absorbent sheet material impregnated with a permanently liquid dielectric composition; a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin; and a plurality of mica splittings interposed between said layers.

23. A laminated body comprising, in combination a plurality of layers of fibrous absorbent sheet material impregnated with a permanently liquid dielectric composition; a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin; and a metal foil interposed between said layers.

24. A laminated body comprising, in combination, a plurality of layers of fibrous absorbent electrically conductive sheet material impregnated with a permanently liquid dielectric composition; and a solid irreversibly hardened synthetic resin surrounding each of said layers of absorbent sheet material penetrating surface portions of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin.

25. In an electrical apparatus a laminated body having dielectric properties comprising, in combination, a plurality of layers of fibrous absorbent sheet material impregnated with a permanently liquid dielectric composition; and a solid irreversibly hardened synthetic resin surrounding each of said layers of absorbent sheet material penetrating surface portions only of the same, the impregnated remainder of each of said layers being free of said solid irreversibly hardened resin, said resin adhering to said layers completely surrounding the same, thereby forming a coherent laminated body in which escape of said liquid dielectric composition is prevented by the surrounding solid synthetic resin.

26. A method of producing a laminated body, comprising the steps of impregnating a fibrous absorbent sheet material with an emulsion essentially consisting of a permanently liquid dielectric composition and a resin hardener; completely covering said impregnated sheet material with a synthetic resin adapted to be irreversibly hardened by said resin hardener; forming a plurality of superposed layers of said resin-covered impregnated sheet material; and hardening said hardenable synthetic resin said dielectric composition remaining in liquid state, so as to form a coherent laminated body consisting essentially of liquid-impregnated layers of absorbent sheet material at least interior portions of which are free of hardened resin, surrounded by said hardened resin, whereby escape of said liquid dielectric composition is prevented by the surrounding solid synthetic resin.

References Cited in the file of this patent

UNITED STATES PATENTS

| | | |
|---|---|---|
| 2,012,948 | Boughton | Sept. 3, 1935 |
| 2,078,422 | Smith | Apr. 27, 1937 |
| 2,209,850 | Shand et al. | July 30, 1940 |
| 2,212,836 | Kohman | Aug. 27, 1940 |
| 2,489,985 | Speight | Nov. 29, 1949 |
| 2,500,600 | Bradley | Mar. 14, 1950 |
| 2,595,501 | Aicher | May 6, 1952 |
| 2,600,457 | Wynstra | June 17, 1952 |
| 2,707,204 | Richardson | Apr. 26, 1955 |

OTHER REFERENCES

"Epoxy Resins in Glass-Cloth Laminates" by I. Silver et al.; published in "Modern Plastics," November 1950, pp. 113, 114, 116, 118, 120 and 122.